Patented May 26, 1936

2,042,410

UNITED STATES PATENT OFFICE 2,042,410

SULPHONIC ACID BODIES AND PROCESS OF MAKING SAME

Joseph O. Peirce, Cincinnati, Ohio, assignor to Kay-Fries Chemicals, Inc., West Haverstraw, N. Y., a corporation of New York No Drawing. Application January 21, 1935, Serial No. 2,749

19 Claims. (Cl. 260—99.12)

This invention relates to polymerized sulphonated hydrocarbons and processes of making them. The polymerized sulphonated hydrocarbons of this invention are stable in hot dilute acids, and are particularly useful as surface tension depressants.

It has been recognized that the sulphonation of certain oils and other organic compounds produces sulphonated compounds that have the property of reducing the surface tension of water and other liquids. As a result of this property such compounds have found extensive use in the various industries for fat splitting, emulsifying, as detergents, emulsion breakers, insecticide emulsifiers, and the like. The compounds of the prior art were, however, subject to disadvantages when applied to particular industries as, for example, when used as catalysts in the production of soaps by the hydrolysis of oils and fats to glycerine and fatty acids. Such reactions are carried out in acid solutions and many of the sulphonic acids of the prior art, when exposed to heated acid solution, rapidly decomposed, thereby losing their efficacy as catalysts in the reactions. Even if stable, they were inefficient and produced low yields or discolored the products produced.

The commercial compounds of the prior art which have proven useful as catalysts for fat-splitting have generally been prepared from sludges or sulphonic acids derived through the sulphuric acid treatment for refining mineral oils. The sulphonic acids were extracted from both the oil and the sludge layer and used either then or after some purification in the processes in question. Such products, since they came from different sources and types of oil, naturally were quite non-uniform in character and a user of the products had to vary his process from time to time as new batches of material were received. For practicing the present invention it is possible to carefully select from unlimited sources the original raw materials which will thereby be of uniform character, producing products which are uniform in batch after batch so that a user of the product need not alter his control conditions when such products are employed in industry. Products produced according to the teachings of this invention, in addition to being uniform, are distinctly lighter in color than corresponding sulphonic bodies produced by the processes of the prior art, which characteristic decreases discoloration due to colored impurities in the reagent which tend to discolor products produced through their use.

The instant invention is concerned with processes for the production of stable surface tension depressants in which sulphonated products are secured from particular types of hydrocarbons or mineral oil derivatives, and these products are useful in many arts, as suggested above, and particularly as catalysts in the hydrolysis of oils and fats even when the hydrolysis is conducted at high temperatures in acid solutions. They act effectively in quantities as small as 0.5%, based on the weight of the oil or fat treated.

The hydrocarbon which is sulphonated to produce the surface tension depressant is preferably a petroleum hydrocarbon fraction from either a paraffin or asphalt base oil which may contain both ring and straight chain compounds, naphthenic and aliphatic, that has been subjected to suitable treatment to cause unsaturation or an increase in the number of double and triple bonds joining the various carbon atoms that are in the compound and particularly such linkages as increase the solubility of such hydrocarbons in sulphuric acid. This unsaturation may be secured in a number of ways as, for example, by dehydrogenation, partial oxidation, cracking, or other means which produce unsaturates soluble in sulphuric acid. Petroleum hydrocarbons, after treatment by any of the foregoing methods and preferably containing a considerable proportion of unsaturates in order that the yield of product will be high, are then subjected to a sulphonation and polymerization or condensation reaction by control of the temperature and time of reaction, as a result of which the new and useful products forming the subject matter of the instant invention are formed. The sulphonation is accomplished by the addition of concentrated or fuming sulphuric acid under conditions such that the temperature of the reacting mass preferably does not rise excessively or cause undesirable gasing. After all of the acid has been added, the reaction is continued, and modified by bringing the reaction mass to an elevated temperature generally above the preferred moderate temperatures of sulphonation and keeping it at this elevated temperature so that in addition to the sulphonation reaction a polymerization or condensation occurs which greatly modifies the character and properties of the resulting sulphonate to produce new and useful compounds.

The hydrocarbon to which the sulphonation treatment is applied may be any of the more reactive or highly unsaturated hydrocarbons. These reactive or unsaturated hydrocarbons can be produced in a number of ways, as for example, by the cracking of high molecular weight hydrocarbons, by the dehydrogenation of hydrocarbons or by the partial oxidation of hydrocarbons in which the reaction is so controlled as generally to avoid insofar as possible the introduction of chemically combined oxygen while at the same time producing compounds with a high degree of unsaturation and solubility in sulphuric acid. Generally speaking, the compounds to be preferred are those prepared so that they have as high a degree of unsaturation as possible.

Such reactive hydrocarbons, containing some chemically combined oxygen, if produced by catalytic partial oxidation, are sulphonated by the addition of approximately an equal quantity of concentrated sulphuric acid. If desired, a fuming sulphuric acid or oleum may be employed, although in such cases it is generally preferable to reduce the amount of acid. As a general rule for a given hydrocarbon increasing the amount or concentration of the acid improves the quality of the final product and the amount of acid desirable or necessary is directly proportional to the degree of unsaturation of the hydrocarbon. On the other hand, lower concentrations of acid may be employed provided the time of acid treatment is extended or the temperature increased or both. The reaction is conducted under controlled temperature conditions either by varying the rate of addition of the acid to the oil or by positive cooling. Upon the completion or substantial completion of this initial reaction, agitation of the products is continued and they are, if necessary, heated above the preferred moderate reaction temperature to not over about 100° C. and maintained at such elevated temperature for a period ranging from one or two hours to eight or more hours. During this time when the mass is subjected to heat and agitation a polymerization or condensation of various molecules in the mass is accomplished. The exact chemical reactions involved have not been specifically ascertained, due to the complexity of the mixture, but it is believed that the various molecules when subjected to such treatment combine as though by polymerization or condensation. It has, however, been definitely determined that this treatment is one of the more important steps of the process and results in producing very marked improvements in the character of the final product by increasing its stability and effectiveness for the purposes set forth, due apparently to some extent to a rearrangement of the sulphonic acid groups in non-hydrolyzing positions.

Instead of subjecting the entire reaction mass to the polymerization and condensation reaction, it is feasible to permit stratification of the mass and subject only the lower sulphonated layer to the polymerization step. Results secured by practicing the process in this manner have been very good but for economic reasons it is usually preferable to subject the entire reaction mass to the elevated temperature treatment in which case some of the unsulphonated hydrocarbons may be condensed or polymerized with the sulphonated compounds.

At the end of the desired time of elevated temperature treatment, the agitation is discontinued and the mass permitted to cool and stratify into two layers, an upper layer of unreacted hydrocarbon which may be termed "top oil", and a lower layer which comprises the sulphonated hydrocarbon with the residual sulphuric acid. The two strata may be readily separated and the top oil returned for further treatment. If the original hydrocarbon is highly reactive, there may be little or no top oil to separate out. The polymerized sulphonated product should be washed with a small amount of water or salt solution, for example, sodium sulphate, to remove the residual acid. If desired, this washed product can be further treated to reduce corrosiveness by neutralizing the remaining sulphuric acid with a caustic or ammonia and, furthermore, the sulphonic acids can be saponified by continued additions of alkali.

Products produced in the manner above described have the property of reducing the surface tension of liquids and are particularly useful in industries where this phenomenon is employed. Such products are very stable, even in the presence of hot dilute mineral acids, which makes them particularly desirable in fat-splitting reactions.

One of the preferred materials used for the sulphonation reaction is a partially oxidized hydrocarbon, prepared by the catalytic partial oxidation of a petroleum hydrocarbon such as gas oil, although instead of using gas oil other hydrocarbon fractions, for example, kerosene, spindle oil and the like may be employed. One of the preferred methods of oxidizing these hydrocarbons is as follows:

The selected hydrocarbon fraction is continuously vaporized, superheated to about 350° C. and delivered to a mixing chamber where a suitable quantity of air is added sufficient to cause a partial oxidation of the hydrocarbon. After thorough mixing, the air and hydrocarbon are passed over a catalytic screen which may be prepared by impregnating a suitable catalyst carrier such as pumice with a multivalent metallic oxide, preferably molybdic oxide. Other catalysts for the partial catalytic oxidation of hydrocarbons may be used instead of the blue oxides of molybdenum such as the oxides of vanadium and uranium. The reactions occuring when passing the gases over the catalyst raise the temperature of the products to about 400 to 415° C. These reaction products are then cooled by passage through a finned cooling section or cooled by any other means so that their temperature is reduced to approximately 350° again. After admitting more air, the mixture of air and reaction products from the first catalytic oxidation are passed over a second catalyst constructed similarly to the first, and the operations of cooling, mixing and oxidation repeated as many as five or six times. It is important, in order to get as high a yield of unsaturates as possible, to control the amount of air and the temperature of each air and hydrocarbon mixture so that the temperature of the reaction products leaving the catalyst do not exceed about 415° C. After the vapors have passed through the several stages of oxidation they may be condensed in a scrubbing tower where a spray of cold oxidized oil washes them and condenses the major part of the partial oxidation products. The condensed oxidized oil, together with the oil added to wash the reaction products, is cooled and a portion recirculated to scrub and wash additional reaction products. Some non-condensible gases are formed which pass through the washer to be collected and used as desired.

When the foregoing process was practiced by using a paraffin base gas oil, a product was formed which was a reddish brown oil of relatively low viscosity and a strong disagreeable odor.

It had a specific gravity of .891 at 60° F. and the boiling range was as indicated in the following table:

| Percent distilled | Temperature |
|---|---|
| | °C. |
| I | 84 |
| 10% | 102 |
| 20% | 217 |
| 30% | 256 |
| 40% | 277 |
| 50% | 292 |
| 60% | 306 |
| 70% | 311 |
| 80% | 324 |
| 90% | 342 |

The product contained about 9.5% by volume of free acids which were removable with sodium hydroxide in the cold and about .05% of aldehydes removable by bisulphite solution in the cold. The oil, after the removal of the free acids and aldehydes, had a mean molecular weight of 235 as determined by the cryoscopic method. A combustion analysis showed 11.9% hydrogen, 80.3% carbon, 7.8% oxygen (determined by difference). The saponification value was 14.55, the acetyl value was 48.22, while 75 to 77% was absorbed by concentrated sulphuric acid in the cold. The foregoing analysis shows that there is a small amount of combined oxygen but, on the other hand, there is a high degree of unsaturation which is one of the more important characteristics of the oils to be treated by sulphonation and polymerization. Products of catalytic partial oxidation may be sulphonated directly or after removal of some of the oxygen containing molecules, i. e., acids, aldehydes and the like.

The unsaturated, dehydrogenated or catalytically oxidized oil, such as that produced by the method just discussed, may now be treated with sulphuric acid to produce sulphonic acids. Since dark colored products contained in the sulphonates or sulphonic acid compounds tend to discolor the materials with which they are used, it is desirable, insofar as possible, to remove such impurities. Unsaturates produced either by catalytic partial oxidation or the other methods above noted, frequently contain some dark colored impurities which may be removed to a considerable extent by distilling the unsaturate and discarding the still residue in which the discolored impurities collect. In a preferred embodiment of the invention, the oil is treated with an approximately equal amount by weight of sulphuric acid of a concentration of about 95 to 96%. The acid is slowly added to the oil while under agitation over a period of about one hour in order that the heat of reaction will not cause the temperature to rise excessively. It is preferable that the temperature be kept below 40 to 45° C. either by controlling the rate of addition of the acid or external cooling means. If desired, the sulphonation may be carried out at higher temperatures, applying pressure, if necessary, by employing a closed vessel. Other steps in the process may be carried out under increased pressure when pressure assists in the reaction.

The concentration of the acid and the amount may be varied to some extent, depending upon the character of the oil, and more particularly, upon its degree of unsaturation and ability to react with sulphuric acid. In some cases it may be desirable to use an acid containing free sulphur trioxide, that is, a fuming acid or oleum. In such cases the relative amount of acid may generally be reduced.

When all of the acid has been added to the oil, the agitation is continued and the temperature of the sulphonated oil gradually raised, if the reaction has been carried out at moderate temperatures, to above about 50° C. and preferably to between 70 and 80° C. It is maintained at this temperature while agitation is continued for a period of time ranging from a few hours to eight or more hours, during which time the sulphonation reaction is, to some extent, continued and other action occurs which is believed to be one of polymerization or condensation. This prolonged treatment at controlled elevated temperatures is very important to secure a product having increased effectiveness in reducing surface tension and especially to prepare products which are stable in the presence of hot dilute mineral acids.

At the end of the polymerization or condensation reaction by the elevated temperature treatment, the sulphonated product may be separated in a number of ways. A simple method is that of stopping the agitation and permitting the material to cool, whereby it stratifies into two layers, the top layer being unreacted oil which may be returned for further sulphonation. When it appears that practically all of the constituents reactive with sulphuric acid have been sulphonated, the top oil may be treated to remove the small amounts of oil soluble sulphonates and free sulphuric acid. This may be accomplished in a number of ways as, for example, by distilling the oil over lime or caustic. The treated oil now freed from corrosive constituents may be subjected to further catalytic partial oxidation. The lower layer is the sulphonated product containing the residual unreacted sulphuric acid which may be removed to a large extent by washing with about 40% of water (based upon the amount of oil sulphonated). In lieu thereof or subsequent thereto a sodium sulphate solution may be employed as a washing medium. Where the oil sulphonated is a gas oil catalytically oxidized in the manner above described, the yield of sulphonated product is equivalent to about 70% of the oxidized oil.

A typical product prepared by the sulphonation and polymerization above described from a catalytically oxidized gas oil is dark brown to black, with a very slight odor of sulphur dioxide. It is a very viscous and almost tarry fluid, with a water content of 10 to 18%, 12 to 14% of free sulphuric acid and 2.5 to 3% of sulphonic acid calculated as sulphuric. Over 50% of it is soluble in chloroform.

Products formed as described above are practically water insoluble and form milky emulsions with great difficulty in boiling water. Where the sulphonation treatment of this invention is applied to the product from the catalytic partial oxidation of kerosene and the reaction mass held at about 65° C. for six hours, a very efficient fat splitter or saponifier is obtained. A less efficient product is secured from a gas oil.

Another way of separating the sulphonated product from the reaction mass is to intimately mix water with it after the elevated temperature polymerization and then let it stand until it stratifies, generally forming three layers. The uppermost layer is of top oil or unsulphonated oil, the middle layer the sulphonated product and the bottom layer an aqueous solution of sulphuric acid. While some of the steps have been described as though part of a batch process, it will be obvious that the process as a whole may readily be performed in a continuous manner.

In the foregoing description of the invention, the process has been described with reference to particular preferred embodiments thereof and with reference to definite control conditions including time, temperature and concentration of reagents. It will be evident to those skilled in the art that various modifications may be made whereby similar results to those obtained in the manner above described may be obtained by suitably varying the control conditions. If less concentrated acid is used, larger amounts are generally necessary and the time of treatment, as well as possibly the temperature, must be increased. It has been definitely noted, however, that where unsaturates of the character described are sulphonated either for a very short time at high temperatures and with high concentration of acids, or for slightly longer periods with lower concentration of acids and lower temperatures, that the products produced do not have catalytic properties to any extent for the fat-splitting reaction. The treatment above described, of extending the time of treatment with acid and preferably at higher temperatures, very definitely affects the character of the product and modifies it by imparting the ability to act as a fat splitting catalyst.

The sulphonates prepared in the manner above described are surface tension depressants and useful as emulsifying agents for various animal fats and vegetable oils in water. Even in the presence of hot dilute acid it acts as a catalyzer in the hydrolysis of fats and oils when used in quantities as low as .5%, based on the weight of the oil or fat treated.

It is often desirable to simplify the shipping problem presented by forming the sodium or ammonium salts of the sulphonic acids present. These sodium or ammonium salts are less corrosive than the sulphonic acids and may frequently be used as such for surface tension depressants, but in the fat splitting reaction the free sulfonic acids are regenerated before use.

The invention has been described with reference to certain preferred embodiments thereof. These examples should be considered as illustrative rather than restrictive of the invention, which is to be limited only in the light of the prior art and by the scope of the appended claims.

I claim:

1. The process for preparing a sulphonated hydrocarbon from an oxidized hydrocarbon which comprises reacting said oxidized hydrocarbon at moderate temperatures with concentrated sulphuric acid, elevating the temperature of the reaction mass to between 50° and 100° C., maintaining said elevated temperature, and then separating the sulphonated hydrocarbon from the unreacted hydrocarbon.

2. The process for preparing a sulphonated hydrocarbon from an unsaturated hydrocarbon which comprises reacting said unsaturated hydrocarbon in a closed space with concentrated sulphuric acid at moderate temperatures, elevating the temperature of the reaction mass to between 50° and 100° C., maintaining said elevated temperature, then separating the sulphonated hydrocarbon from the unreacted hydrocarbon.

3. The process for preparing a sulphonated hydrocarbon from a reactive hydrocarbon which comprises reacting said hydrocarbon with concentrated sulphuric acid at moderate temperatures, bringing the reaction mass to a temperature above about 50° C., but not exceeding 100° C., maintaining such temperature for from about two to eight hours, then separating the sulfonated product from the unreacted hydrocarbon.

4. The process for preparing a sulphonated hydrocarbon which comprises reacting a dehydrogenated liquid hydrocarbon with sulphuric acid at a moderate temperature, heating the reaction product to from 70–80° C. and agitating while maintaining this temperature for several hours to cause further reaction and polymerization, separating the polymerized sulphonated product from the unreacted hydrocarbon and recovering the polymerized sulphonated product.

5. A product useful as a fluid surface tension depressant and fat splitting catalyst essentially comprising a catalytically partially oxidized hydrocarbon, sulphonated and polymerized at a temperature between 50° and 100° C.

6. A product useful as a fluid surface tension depressant and fat splitting catalyst essentially comprising an unsaturated liquid hydrocarbon, sulphonated and polymerized at a temperature between 50° and 100° C.

7. A product useful as a fluid surface tension depressant and fat splitting catalyst essentially comprising a substantially fatty acid free hydrocarbon obtained by catalytic oxidation, sulphonated and polymerized at a temperature between 50° and 100° C.

8. A product useful as a surface tension depressant and fat splitting catalyst essentially comprising a sulphonated polymerized hydrocarbon, dark brown to black, very viscous, containing 10–18% water, 12–14% free sulphuric acid, 2.5–3% sulphonic acid figured as sulphuric acid and more than half of which is soluble in chloroform.

9. A product useful as a surface tension depressant and fat splitting catalyst essentially comprising a sulphonated polymerized hydrocarbon, dark brown to black, very viscous, containing 10–18% water, 12–14% of the sulphate of a stable base, 2.5–3% sulphonic acid figured as sulphuric acid and more than half of which is soluble in chloroform.

10. A product useful as a surface tension depressant and fat splitting catalyst essentially comprising a sulphonated polymerized hydrocarbon, dark brown to black, very viscous, containing 10–18% water, 12–14% of the sulphate of a stable base, 2.5–3% of the sulphonates of a stable base figured as sulphuric acid and more than half of which is soluble in chloroform.

11. The process for preparing a sulphonated hydrocarbon which comprises catalytically oxidizing a hydrocarbon oil to produce a product with a high degree of unsaturation, reacting the catalytically oxidized oil with sulphuric acid, polymerizing the reaction product, and recovering said reaction product from the unreacted oil.

12. The process for preparing a sulphonated hydrocarbon which comprises catalytically oxidizing a petroleum hydrocarbon to produce a product with a high degree of unsaturation, reacting the unsaturated hydrocarbon with sulphuric acid at controlled temperatures, elevating the temperature not exceeding 100° C. to polymerize the sulphonated product and recovering said sulphonated polymerized hydrocarbon from the reaction mass.

13. The process for preparing a sulphonated hydrocarbon which comprises catalytically oxidizing a petroleum hydrocarbon to produce a product with a high degree of unsaturation, reacting the unsaturate with about an equal weight of sulphuric acid, agitating and maintaining the sulphonic acids at an elevated temperature not exceeding 100° C. to cause polymerization.

14. The process for preparing a sulphonated hydrocarbon which comprises catalytically oxidizing a petroleum hydrocarbon to produce a product with a high degree of unsaturation, slowly adding sulphuric acid and keeping the temperature below about 50° C., raising the temperature to above 50° C. and maintaining the elevated temperature at a point not exceeding 100° C. to cause polymerization of the reaction products from the sulphonation reaction.

15. The process which comprises heating a mixture of sulphuric acid and catalytically oxidized petroleum fractions to at least about 50° C. and not substantially exceeding 100° C. to effect a controlled sulphonation and polymerization of the reactive organic constituents of the oil.

16. A composition of matter useful as a surface tension depressant and fat splitting catalyst essentially comprising sulphonated bodies from catalytically oxidized petroleum fractions polymerized at temperatures between about 50° and 100° C.

17. A composition of matter useful as a surface tension depressant and fat splitting catalyst essentially comprising sulphonated bodies from catalytically oxidized petroleum fractions polymerized and in which any free sulphuric acid has been neutralized by a stable base.

18. A composition of matter useful as a surface tension depressant and fat splitting catalyst essentially comprising sulphonated bodies from catalytically oxidized petroleum fractions polymerized and in which both the free sulphuric acid and the sulphonic acids present are neutralized by a suitable base.

19. A catalyst for the hydrolysis of oils and fats essentially comprising catalytically partially oxidized hydrocarbon, sulphonated and polymerized at temperatures between about 50° and 100° C.

JOSEPH O. PEIRCE.